Figure 1:
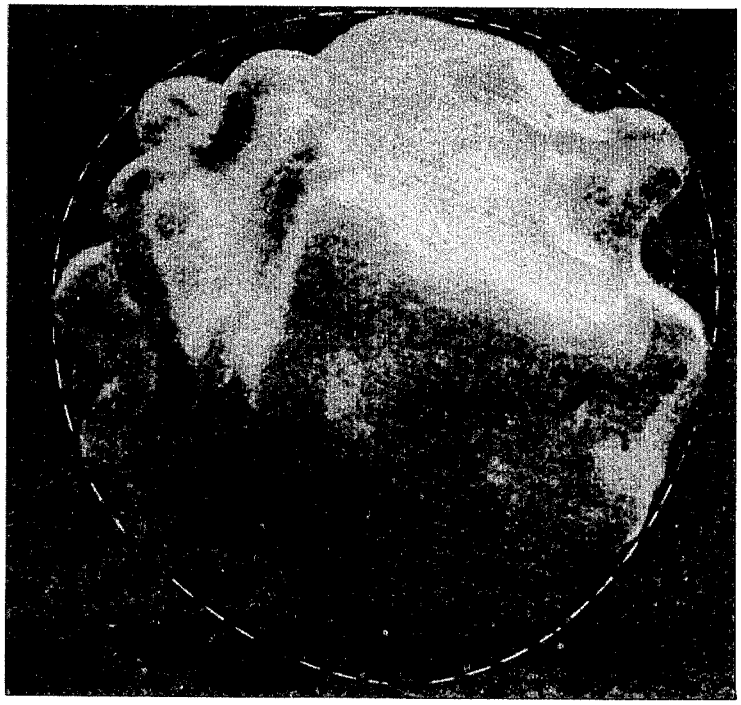

United States Patent [19]

Schaefer et al.

[11] 4,374,044
[45] Feb. 15, 1983

[54] CORDIERITE BEAD CATALYST SUPPORT AND METHOD OF PREPARATION

[75] Inventors: Carl F. Schaefer, Flint; Raymond E. Bedford, Burton, both of Mich.

[73] Assignee: General Motors Corporation, Detroit, Mich.

[21] Appl. No.: 226,162

[22] Filed: Jan. 19, 1981

[51] Int. Cl.³ .................. B01J 21/16; B01J 20/30; B01J 35/08
[52] U.S. Cl. .................. 252/455 R; 252/477 R
[58] Field of Search .................. 252/455 R, 477 R

[56] References Cited

U.S. PATENT DOCUMENTS

| | | | |
|---|---|---|---|
| 2,941,958 | 6/1960 | Connor, Jr. et al. | 252/477 R |
| 3,162,607 | 12/1964 | Burbidge et al. | 252/477 R |
| 3,943,064 | 3/1976 | Ballain et al. | 252/455 R |
| 3,954,672 | 5/1976 | Somers et al. | 252/455 R |
| 4,051,072 | 9/1977 | Bedford et al. | 252/464 |
| 4,077,908 | 3/1978 | Stenzel et al. | 252/455 R |

*Primary Examiner*—Carl F. Dees
*Attorney, Agent, or Firm*—Sidney Carter

[57] ABSTRACT

A high strength, high macro-pore volume, porous cordierite bead support having a dimpled or raspberry-like surface resulting from processing of inexpensive raw materials to produce cordierite on firing and including high plasticity clay and colloidal silica.

6 Claims, 3 Drawing Figures

CORDIERITE BEAD CATALYST SUPPORT AND METHOD OF PREPARATION

This invention relates to the preparation of a catalyst support and more particularly to a cordierite support structure of the bead type having a peculiar raspberry-like or dimpled surface geometry to increase the surface available for catalyst distribution and having the high strength required to withstand the load and vibration forces encountered in normal use in the vehicle converter while having high macro-porosity.

The treatment of vehicle exhaust has advanced to the point where the stringent emissions requirements are being satisfied by various systems utilizing catalytic treatment to convert carbon monoxide, unburned hydrocarbons and nitrogen oxides to carbon dioxide, water, and nitrogen. Such treatment requires refractory support structures for catalyst distribution which are thermally stable and have high strength or crush resistance while being either porous as in γ-alumina or having sufficient porosity for firm adhesion of the washcoat material such as γ-alumina. It is also desirable that the support materials be inexpensive.

Catalyst supports for emissions control purposes have been developed in two forms. The form of pellets, spherical or otherwise shaped, made of high surface area materials with controlled porosity, principally active alumina, on which the catalyst is directly applied. Typical of such pellet support is that disclosed in U.S. Pat. No. 4,051,072 to Bedford et al. dated Sept. 27, 1977. Alternatively, the monolith or honeycomb structure is used, the support being formed of a refractory, low coefficient of thermal expansion material such as cordierite, β-spodumene, etc. These latter materials, being inactive with low porosity, are used in conjunction with a high surface area coating on which the catalyst can be distributed to produce the desired reactivity with the exhaust gas. U.S. Pat. No. 3,954,672 to Somers et al., dated May 4, 1976 is typical of such monolith supports.

We have developed a procedure and materials formulation for making a highly macro-porous, cordierite, bead type catalyst support using low cost materials and having a dimpled surface for increased geometric surface area.

Accordingly, it is an object of our invention to provide a cordierite support structure of the bead type having a raspberry-like or dimpled surface.

It is a further object of our invention to provide a cordierite bead having a high degree of macro-porosity and good crush strength to withstand the load and vibration forces encountered in use.

It is yet another object of our invention to provide a method for production of a highly macro-porous, cordierite, bead type catalyst support having a raspberry-like dimpled surface and using low cost materials.

Figure 2:
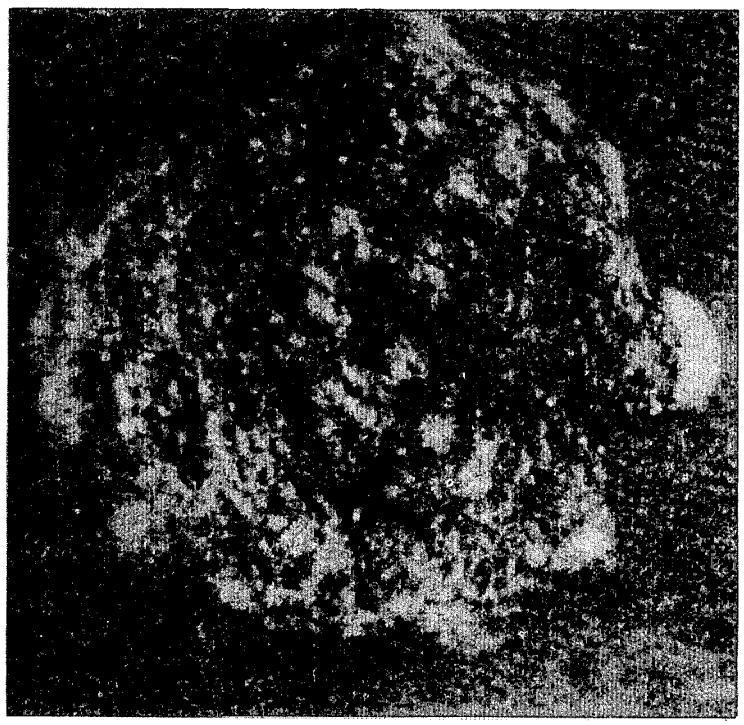
Figure 3:
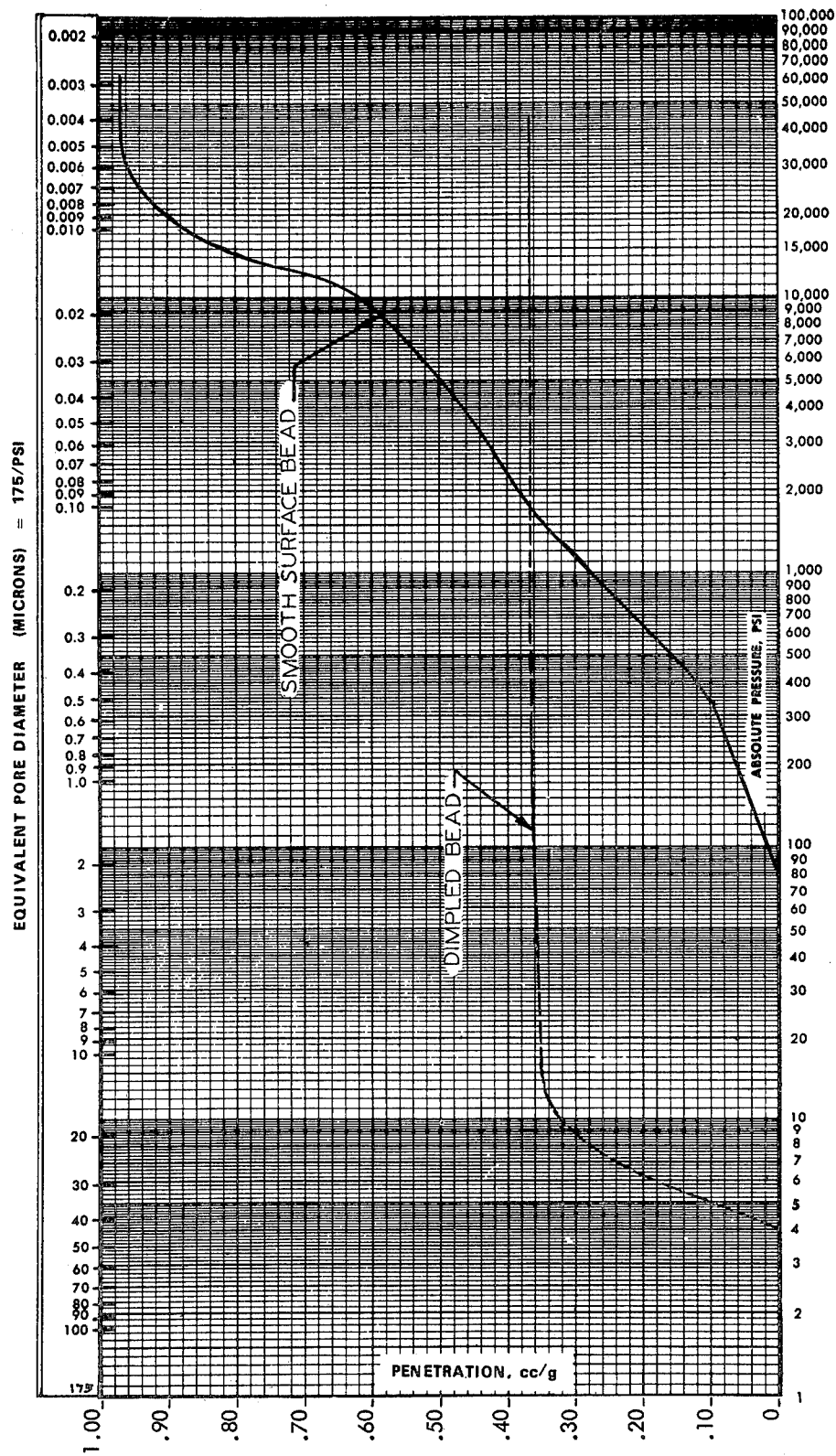

These and other objects of our invention will be apparent from the description which follows and from the drawings in which FIG. 1 shows an enlargement of a catalyst support bead made in accordance with our invention, FIG. 2 is an enlargement of a cross-section of a bead of our invention, and FIG. 3 shows a mercury porosimetry chart from which the high macro-porosity of our support is clearly apparent.

In accordance with our invention, we have been able to combine the advantages of a bead support having a high macro-pore volume with those of a cordierite monolith support having a high surface area catalyst carrier coating. More particularly, the cost of mmaterials is reduced in a substantial way by using materials which are readily available, e.g., talc, ball clay, alumina trihydrate and colloidal silica as distinguished from active alumina having a low alkali metal content. Relatively high cost alumina is used only in applying the high surface area coating on the support as in its application to monolith type supports. As disclosed in U.S. Pat. No. 3,954,672, the silica magnesia and alumina materials used in formulating the batch for production of beads, and their amounts, should be such as to produce a bead which on firing results in cordierite as the major phase which has a low coefficient of thermal expansion and therefore results in thermal stability and resistance to thermal shock and material breakdown. The high surface area alumina coating is applied as a slurry prior to the firing and may be either that well known in the art or it may be a slurry of alumina granules which have a precipitated coating of hydrated cerium oxide as disclosed in copending application Ser. No. 211,371, filed Nov. 28, 1980. A significant advantage flowing from the use of a separate coating on the cordierite support bead is that it is possible to manipulate each separately so as to achieve the highest performance in the control system.

The high macro-porosity of our cordierite bead, as shown in FIG. 3, is significant in that not only is the washcoating material, e.g., γ-alumina firmly anchored to the support so as to minimize spalling and flaking-off of the catalyzed coating, but it enables the catalyzed material to penetrate into the subsurface pore structure where it is shielded from direct exposure to the poisons such as lead and phosphorous present in the exhaust. Also, the subsurface location protects the catalyzed material from wear and abrasion and the material itself may be manipulated to increase porosity in any of the known methods.

We achieve the high surface area dimpled or raspberry-like surface geometry shown in FIGS. 1 and 2 by proper formulation of the batch materials and, preferably, the use of colloidal silica during bead formation on a conventional disc pelletizer. It is essential that the clay used have sufficient plasticity when used or mixed with the colloidal silica, or water, in the amounts selected to produce the desired raspberry-like surface. The plasticity should not be so high as to prevent the formation of small beads and their agglomeration (here intended to mean the attachment of the small beads to each other while maintaining voids between contiguous bead surfaces) to produce the desired size dimpled or raspberry-like bead when the dry batch material and colloidal silica, or water, are fed onto the rotating disc. When the plasticity is too high the materials coalesce without forming beads and instead form an amorphous mass. For example, we have found that the ball clays are suitable in our processing whereas the kaolins are not. On the other hand, the desired surface geometry is not achieved when using materials having insufficient plasticity, e.g., calcined clay, the beads having smooth surfaces. It should be understood that while we prefer to use colloidal silica for pelletizing the dry materials, we may use only water, it being then necessary to increase the amount of silica in the dry materials to achieve the formation of cordierite. The use of colloidal silica is preferred since it results in a more pronounced, better formed raspberry-like surface.

As shown in FIG. 2, the interior of the cordierite bead made in accordance with our invention has a highly macro-porous structure by reason of the bonding together of the smaller beads to produce voids between contiguous beads. Further control of total macro-pore volume may be achieved by the addition of combustible fillers, e.g., organic microspheres or particles or fibers such as cellulose, to the batch of dry materials to be pelletized. This produces a network of passages having a diameter larger than about $20\mu$ through the body of the bead. The use of such filler materials is exemplified by U.S. Pat. No. 4,051,072. It is desirable for the formation of the bead of our invention that the organic filler material be limited to a maximum of about $75\mu$ in length or largest dimension. The quantity of filler may be readily determined and will vary with the type of filler and desired porosity.

By way of example, the cordierite bead of our invention may be produced by preparing a material batch as in Table I, amounts being in weight percent, the batch being dry-mixed to achieve substantial homogeneity.

TABLE I

| talc[1] | about 32% |
|---|---|
| ball clay[2] | about 27% |
| alumina trihydrate[3] | about 26% |
| cellulose fiber[4] | about 15% |

[1]Steawhite Talc ® - Cyprus Mines Corp. Trenton, N.J.
[2]Jackson Ball Clay ® - Kentucky-Tennessee Clay Co. Mayfield, Ky.
[3]Alcan H-10 Alumina ® - Alcan Aluminum Corp. New York, N.Y.
[4]Solka Floc BW-300 ® - Brown Co. Berlin, N.H.

The dry batch is then fed onto the rotating disc of a conventional pelletizer together with a colloidal silica which contains 30% by weight silica. The colloidal silica is diluted with water in the amount of about 83% by weight of the colloidal solution used and the resulting solution is sprayed onto the disc separate from the dry batch feed stream in a manner well known to those skilled in the art. The feed rates are adjusted to produce pellets having about 28% water. The colloidal silica not only helps produce the dimpled bead of our invention, but also enhances dry strength prior to firing and provides part of the silica required to develop the desired cordierite on firing. The colloidal silica is commercially available and may be obtained from E. I. duPont de Nemours & Co. under the trade name Ludox AS-40 Colloidal Silica. While we have shown one formulation for obtaining the desired bead surface geometry, macro-porosity, and strength, it should be understood that other formulations can be used as indicated by the above description and teachings, cordierite being the principal phase in the preferred fired body.

The resulting pellets have the desired raspberry-like or dimpled surface shown in the drawing. These green beads may then be re-rolled in any suitable manner to compact the material for further strength and attrition resistance without eliminating the desired surface structure. We have found it satisfactory to use a closed-end cylinder rotated at about 40 rpm for about 5 minutes, the cylinder being mounted horizontally about its axis of rotation. The resulting beads are dried to remove free water and then fired using a schedule of about 9 hours to reach the firing temperature of about 1390°–1410° C. with about 4-hours at the maximum temperature. This results in the formation of cordierite and the burn-out of the organic filler.

As shown in Table II, based on the porosimeter tests shown in FIG. 3, the beads of our invention have a macro-pore volume of 0.369 cc/g whereas that of the typical commercial, low density, active alumina bead of substantially the same diametric size having a substantially smooth surface is zero. The data shown in FIG. 3 was obtained by mercury penetration measurements using a 60KPSI Aminco Porosimeter.

Also, it can be seen from Table II that though the beads of our invention have 12.3% more surface area than that of the commercial bead, it still has only a 1.2% attrition loss as compared to 12.8% for the commercial bead. Attrition resistance was measured on dimpled cordierite pellets and alumina pellets which were coated with a cerium-alumina washcoat prepared in the same manner described in our copending U.S. application, Ser. No. 211,371 filed Nov. 28, 1980. The attrition test provides a measure of the coated pellets resistance to attrition by self-impact and abrasion caused by the high velocity flow of gas.

The geometric surface area comparison was obtained by enlarging the bead photo in FIG. 1 to twice the size shown and measuring the plan view perimeter of the dimpled bead, 23.07 average, and of an equivalent smooth surfaced bead as defined by the continuous line drawn to envelop all of the dimple peaks measured to obtain the dimpled perimeter, the equivalent perimeter being 21.77 average. This enabled calculation of the diameters and surface areas which represent a reasonable basis for comparison.

TABLE II

| Bead | Dimpled Cordierite | Alumina |
|---|---|---|
| Coefficient of Thermal Expansion per °C. (Handbook Value) | $2.25 \times 10^{-6}$ | $7 \times 10^{-6}$ |
| Micro-pore Volume | negligible | 0.943 cc/g |
| Macro-pore Volume | 0.369 cc/g | 0 |
| Geometric Surface Area | 12.3% greater than for alumina bead | |
| Attrition Loss | 1.2% | 12.8% |

The improved characteristics of the support of our invention are of obvious benefit in preparing a catalyst for control of vehicle emissions. The beads prepared in accordance with our teachings are coated with a high surface area coating such as alumina, e.g., the coating slurry taught in our copending U.S. application, Ser. No. 211,371 filed Nov. 28, 1980, the slurry being preferably catalyzed with noble metals in sufficient amount to achieve the chemical reactions desired. The beads of our invention have been tested and good crush strength under normal operating conditions has been demonstrated.

Our work with the cordierite pellets here described and the coatings covered by our copending application shows that the catalyzed slurry penetrates uniformly into the cordierite support for a distance of about $150\mu$ without substantial reduction in substrate outer shell porosity. Since macro-porosity is retained, exhaust gas diffusion into the support, and therefore contact with the catalyst metals, remains at a high level. Since the catalyzed slurry penetrates into the cordierite pellet to a protected position and does not build up on the pellet surface to the extent it does on alumina pellets and coated monoliths, catalyst and coating loss due to abrasion and other forces is minimized during service life. And since the geometric surface area of the pellet is greater than that of an alumina pellet of comparable size, the extent of exhaust gas-catalyst contact is further improved.

From the foregoing it is apparent we have developed an improved support pellet for catalytic conversion. Variations and equivalents will be obvious to those skilled in the art, e.g., the dry batch materials may be those required for forming other refractory ceramic compositions such as β-spodumene and the like, catalyst material may be applied after coating of the pellets, and alumina may be used in lieu of its precursor alumina trihydrate. Such modifications are considered within the scope of our invention as covered by the claims which follow.

The embodiments of the invention in which an exclusive property or privilege is claimed are defined as follows:

1. A thermally stable cordierite bead catalyst support having a high geometric surface area, high macro-porosity, and good crush strength, and having a dimpled or raspberry-like surface, said cordierite bead resulting from the disc pelletizing of a dry homogeneous mixture of talc, clay, alumina or its precursor powder and a combustible organic filler, together with a separate spray stream of water or of aqueous colloidal silica, the resulting beads being dried and fired to burn-out the organic filler and to form cordierite, said clay and the feed rate of said streams being such as to produce a plasticity of the materials when mixed on the rotating disc of the pelletizer sufficient to form small beads which agglomerate.

2. A porous cordierite bead catalyst support having a dimpled or raspberry-like surface presenting a high geometric surface area and having good crush strength, said cordierite bead being formed by disc pelletizing a dry homogeneous batch consisting essentially of, by weight, about 32% talc, about 27% ball clay, about 26% alumina trihydrate and about 15% cellulose fiber, a separate stream of colloidal silica being sprayed on the disc, the feed rates of the dry batch and of the colloidal silica being adjusted to produce a bead having about 28% by weight liquid, the resulting bead being dried and fired to burn-out said cellulose and cause the batch materials to react and form a cordierite body having high strength and high macro-porosity.

3. In a refractory ceramic catalyst support bead, a dimpled or raspberry-like surface presenting a high geometric surface area, and a body structure having high macro-porosity resulting from the agglomeration of small beads on a rotating disc to produce a bead of the desired size having voids between contiguous beads and good crush strength.

4. In a method for forming a thermally stable refractory ceramic bead catalyst support having a dimpled or raspberry-like surface with high geometric surface area and good crush strength, the steps of dry mixing desired ceramic materials including clay to form a substantially homogeneous material batch, feeding a stream of said dry material onto a rotating pelletizer disc, feeding a separate stream of colloidal silica or water onto said disc, the amount of each of the constituents in said streams being such as to produce small beads which agglomerate to form a bead of desired size which on calcination produces the desired refractory ceramic, drying the resulting beads to remove free water, and firing the beads, said clay and the feed rate of said streams being such as to produce such plasticity when mixed on the disc of the pelletizer as to enable the formation of small beads which agglomerate, and without becoming so soft as to produce an amorphous mass.

5. In a method for forming a thermally stable cordierite bead catalyst support having a dimpled or raspberry-like surface with high geometric surface area, high macro-porosity and good crush strength, the steps of dry mixing talc, clay, alumina or its precursor powder and a combustible organic filler to form a substantially homogeneous material batch, feeding a stream of said dry material onto a rotating pelletizer disc, feeding a separate stream of colloidal silica onto said disc, the amount of each of the constituents in said streams being such as to produce a bead which on firing contains cordierite as the principal phase, drying the resulting beads to remove free water, and firing the beads to burn-out the organic filler and form cordierite, said clay and the feed rate of said streams being such as to produce sufficient plasticity when mixed on the disc of the pelletizer as to enable the formation of small beads which agglomerate without becoming so plastic as to produce an amorphous mass.

6. A process for preparing a cordierite bead catalyst support having a dimpled or raspberry-like surface with a high geometric surface area, which comprises dry mixing to form a substantially homogeneous material batch, about 32% talc, about 27% ball clay, about 26% alumina trihydrate and about 15% cellulose fiber, all by weight, feeding a stream of said dry material onto a rotating pelletizer disc, feeding a separate stream of colloidal silica onto said disc, the feed rates of the dry materials and of colloidal silica being such as to produce a dimpled or raspberry-like surfaced bead having about 28% by weight liquid and having sufficient silica to produce a bead which on firing contains cordierite as the principal phase, drying the resulting beads to remove free water, and firing the beads to burn-out said cellulose and cause the batch material to react to form a cordierite body having high strength and high macro-porosity.

* * * * *